United States Patent
Yue et al.

(10) Patent No.: US 8,307,433 B2
(45) Date of Patent: Nov. 6, 2012

(54) CLIENT SIDE USERNAME/PASSWORD CREDENTIAL PROTECTION

(75) Inventors: Chuan Yue, Hampton, VA (US); Haining Wang, Vienna, VA (US)

(73) Assignee: College of William and Mary, Williamsburg, VA (US)

( * ) Notice: Subject to any disclaimer, the term of this patent is extended or adjusted under 35 U.S.C. 154(b) by 557 days.

(21) Appl. No.: 12/622,513

(22) Filed: Nov. 20, 2009

(65) Prior Publication Data

US 2011/0126289 A1    May 26, 2011

(51) Int. Cl.
G06F 11/00 (2006.01)
G06F 12/14 (2006.01)
G06F 12/16 (2006.01)
G08B 23/00 (2006.01)

(52) U.S. Cl. ......... 726/22; 726/4; 726/5; 726/7; 726/14; 726/17; 726/23; 726/26; 713/165; 713/166; 713/168; 713/170; 713/184; 713/155; 713/183; 709/229; 709/238; 709/239; 380/33; 705/30; 705/35; 715/234; 715/700

(58) Field of Classification Search ............ 726/26
See application file for complete search history.

(56) References Cited

U.S. PATENT DOCUMENTS

| | | | |
|---|---|---|---|
| 2007/0192853 A1* | 8/2007 | Shraim et al. | 726/22 |
| 2007/0192855 A1 | 8/2007 | Huylten et al. | |
| 2008/0028444 A1* | 1/2008 | Loesch et al. | 726/4 |
| 2009/0025066 A1 | 1/2009 | Roytblat et al. | |
| 2009/0228780 A1* | 9/2009 | McGeehan | 715/234 |
| 2009/0235360 A1 | 9/2009 | Hamilton, II et al. | |

OTHER PUBLICATIONS

Chandrasekaran et al.; "PHONEY: mimicking user response to detect phishing attacks", World of Wireless, Mobile and Multimedia Networks, (2006).

Forencio, D.A.F., and Herley, C.; "Password Rescue: A New Approach to Phishing Prevention", Proceedings of the 1st USENIX Workshop on Hot Topics in Security, (2006).

Yue, C., and Wang, H.; "Anti-Phishing in Offense and Defense", Proceedings of the 2008 Annual Computer Security Applications Conference, pp. 345-354, published Dec. 8, 2008.

* cited by examiner

Primary Examiner — Nathan Flynn
Assistant Examiner — Bryan Wright
(74) Attorney, Agent, or Firm — Jason P. McDevitt

(57) ABSTRACT

A method of protecting username/password (U/P) credentials operates on a client computer that cooperates with an anti-phishing scheme that generates a client warning at the client computer when a suspected phishing website issues a U/P request. At the client computer, a set of S fake U/P credentials is generated when the client warning is heeded, or a set of (S−1) fake U/P credentials are derived from a client-supplied U/P credential provided after the client warning is ignored. The client computer then transmits to the suspected phishing website one of (i) the set of S fake U/P credentials, and (ii) the client-supplied U/P credential along with the set of (S−1) fake U/P credentials.

36 Claims, 3 Drawing Sheets

CLIENT SIDE USERNAME/PASSWORD CREDENTIAL PROTECTION

STATEMENT REGARDING FEDERALLY SPONSORED RESEARCH AND DEVELOPMENT

This invention was made with government support under Grant No. CNS0627339 awarded by the National Science Foundation. The government has certain rights in the invention.

CROSS-REFERENCE TO RELATED APPLICATIONS

Not applicable

FIELD OF THE INVENTION

The invention relates generally to the protection of one's username and password credential from unauthorized use by individuals or organizations trying to obtain the credential through phishing operations.

BACKGROUND OF THE INVENTION

In today's computerized internet world, an individual's financial privacy and security is very often only protected by a username and password. The individual is tasked with protecting this username/password (U/P) "credential" by keeping the credential secure and secreted from unauthorized use. However, everyday use of one's U/P credential frequently leads to a lapse in the secure maintenance of one's U/P credential. For example, some unscrupulous websites operate with the sole purpose of tricking an individual into providing their U/P credential. Once obtained, operators of these websites can then "appear" as the individual to a legitimate website, e.g., a bank's website, a stock broker's website, etc. These types of unscrupulous websites are known as phishing websites and their attempts to trick an individual into providing their U/P credential are known as phishing attacks.

A phishing attack is typically carried out using an email or an instant message in an attempt to lure recipients to a fake website to disclose personal credentials. To defend against phishing attacks, a number of countermeasures have been proposed and developed. Server-side defenses employ SSL certificates, user-selected site-images, and other security indicators to help users verify the legitimacy of websites. Client-side defenses equip web browsers with automatic phishing detection features or add-ons to warn users away from suspected phishing sites. However, recent usability studies have demonstrated that neither server-side security indicators nor client-side toolbars and warnings are successful in preventing vulnerable users from being deceived. This is mainly because phishers can convincingly imitate the appearance of legitimate websites, users tend to ignore security indicators or warnings, and users do not necessarily interpret security appropriately. In fact, some studies show that up to 50% of users will ignore a warning and enter the U/P credential. This is true even if the warnings are strong and overt in nature such that a user must actively select to ignore the warning.

SUMMARY OF THE INVENTION

Accordingly, it is an object of the present invention to provide a method of protecting username/password (U/P) credentials.

Another object of the present invention is to provide a client side method of protecting U/P credentials.

Still another object of the present invention is to provide a method of protecting U/P credentials that operates automatically each time a phishing attack is suspected.

Yet another object of the present invention is to provide a method of protecting U/P credentials even if a user provides their U/P credential when prompted to do so by a phishing attack.

Other objects and advantages of the present invention will become more obvious hereinafter in the specification and drawings.

In accordance with the present invention, a method of protecting username/password credentials is provided. It is assumed that a client computer cooperates with an anti-phishing scheme that generates a client warning at the client computer when a suspected phishing website issues a username/password request. Then, at the client computer, a set of S fake username/password credentials is generated when the client warning is heeded, or a set of (S−1) fake username/password credentials are derived from a client-supplied username/password credential provided after the client warning is ignored. The client computer then transmits to the suspected phishing website one of: (i) the set of S fake username/password credentials, and (ii) the client-supplied username/password credential along with the set of (S−1) fake username/password credentials. If the fake username/password credentials are correlated in accordance with a known rule, legitimate websites can apply the known rule to determine if failed login attempts are originating from phishers that received the fake username/password credentials.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
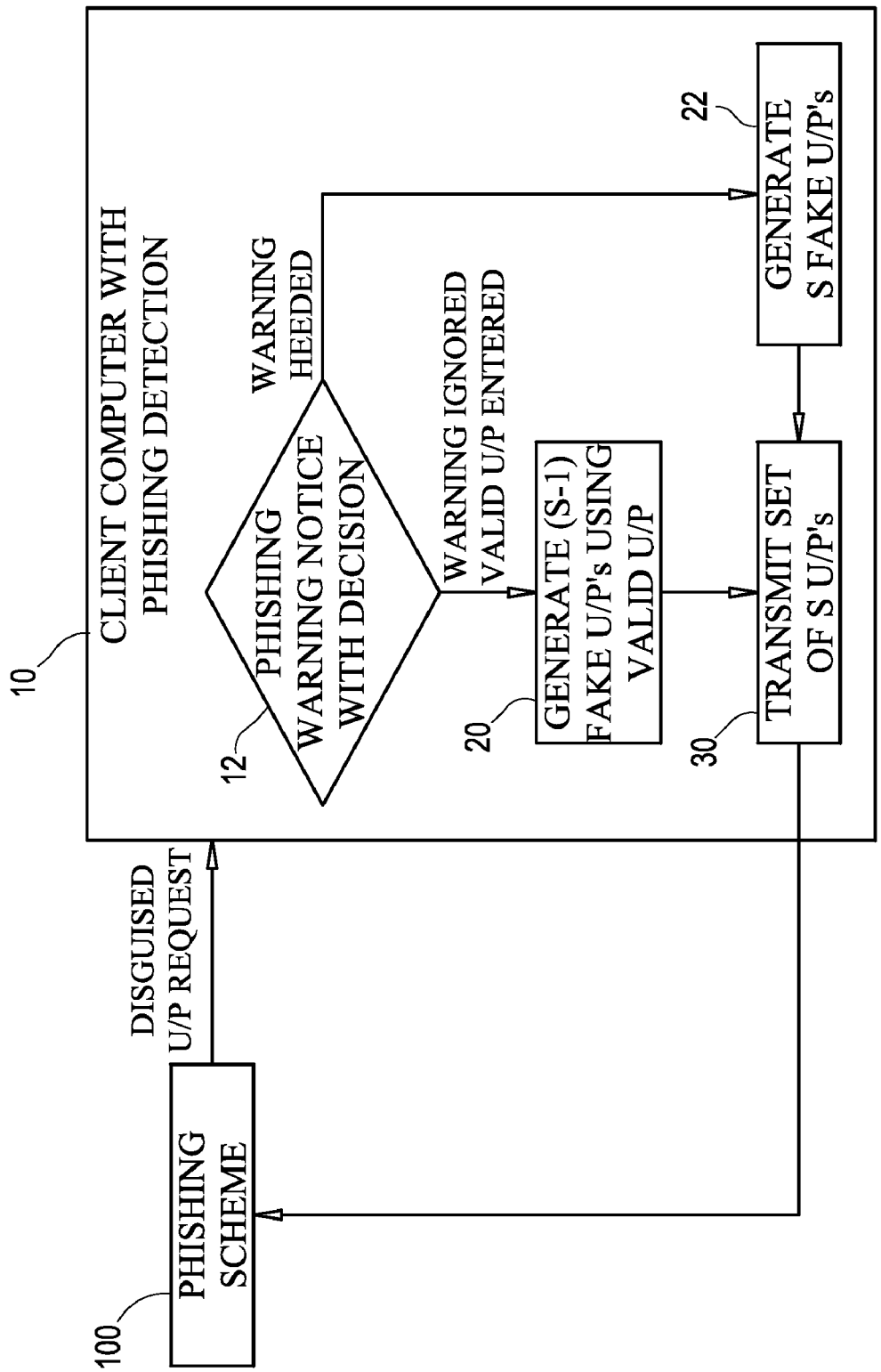
FIG. 1 is a top-level schematic view of a username/password credential protection scheme operating on a client computer in accordance with the present invention.

Referring now to the drawings and more particularly to FIG. 1, a client computer implementing a username/password (U/P) protection scheme in accordance with the present invention is referenced by numeral 10. Client computer 10 can be any standalone computer (e.g., hand-held device such as a cell phone, laptop, desk top, main frame, etc.) or a single computer in a network of such computers that is able to receive requests for information from an outside (i.e., remotely-located) source. For purposes of the present invention, the outside source is a phishing scheme 100 that issues a U/P request to client computer 10 that is typically disguised so that it appears to be originating from a legitimate source. Although not a requirement of the present invention, phishing scheme 100 typically issues such disguised U/P requests over a distributed network such as the internet. As is known in the art, such disguised U/P requests can come in the form of an email or instant message. When the email/message is opened, a login screen prompts the client computer's user to input their U/P credential on a screen view that mirrors that of a legitimate source.

Figure 2:
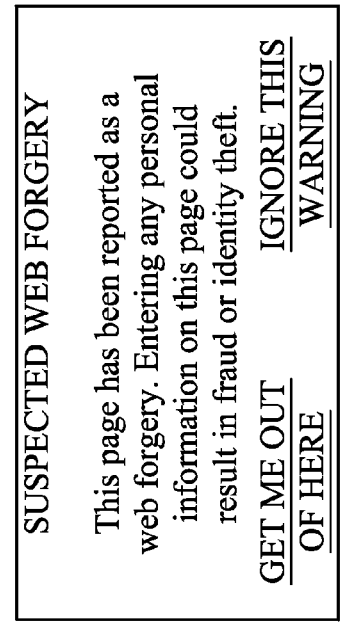
FIG. 2 illustrates a conventional notice presented on a client computer's display screen when a phishing scheme has been detected.

The present invention assumes that client computer 10 is "protected" by one or more phishing detection schemes using one or more methods known in the art. The particular choice of phishing detection scheme(s) used and the implementation thereof are not part of, or limitations on, the present invention. For example, a variety of well-known phishing detection schemes are based on blacklist or heuristic techniques, while the implementation thereof can be routines running on or "in front of" client computer 10 or routines running as part of an internet web browser operating on client computer 10. Even though phishing detection schemes range from very good to nearly perfect in terms of phishing detection, they merely generate a warning notice for the user of client computer 10. The warning notice is generally displayed on client computer 10. For purpose of the present invention, it will be assumed that the generated warning notice appears with (e.g., overlaid or alongside) a U/P login screen falsely created by phishing scheme 100. It is further assumed that the warning notice requires some type of decision/response by the user of client computer 10. An exemplary warning notice that might be displayed on client computer 10 is illustrated in FIG. 2. Note that a user must select one of two responses in order to remove the warning notice. If the user decides to heed the warning, the user selects the "Get me out of here" button and the phishing login screen (not shown) is closed. If the user decides to ignore the warning, the user selects the appropriate button and the phishing login screen will be accessible to the user.

The novel process of the present invention is triggered automatically whenever the client computer's cooperating phishing detection scheme classifies an incoming login page or U/P request as originating from a phisher. That is, the present invention is initiated regardless of a user's decision to heed or ignore a phishing detection warning. Thus, the present invention operates to protect both careful users that heed such warnings, as well as less-careful users that ignore such warnings and might enter their valid U/P credential on a phishing login screen.

Referring again to FIG. 1, when the client computer's cooperating phishing detection scheme determines that a U/P requesting login page is from a phisher, a warning notice (e.g., as shown in FIG. 2) is displayed and prompts the user for a decision at decision block 12. If the user ignores the warning and proceeds to phisher's login screen, the present invention implements process steps 20 and 30. However, if the user heeds the warning, the present invention implements process steps 22 and 30.

In general, each of process steps 20 and 22 generates a number of bogus or fake U/P credentials that are transmitted at step 30 to phishing scheme 100. For the case where a user ignores the warning presented by phishing detection scheme 12, process step 20 intercepts the user-provided (and assumed to be valid for purpose of this description) U/P credential and uses it to generate (S−1) bogus or fake U/P credentials where the valid U/P credential serves as the base credential from which the (S−1) fake credentials are derived. A resulting set of S U/P credentials includes the valid U/P credential and the (S−1) fake U/P credentials.

For the case where a user heeds the warning presented at decision block 12, process step 22 generates a set of S bogus or fake U/P credentials. The generation of S fake U/P credentials can be accomplished in a variety of ways without departing from the scope of the present invention. For example, an initial fake U/P credential could be created and (S−1) additional fake U/P credentials could be created therefrom (e.g., via a substitution rule as will be explained further below). In order to appear legitimate, the fake username should generally look like a real username (e.g., janetc, carlwork, etc.) and not a set of randomly-generated letters/numbers since most people have usernames that do not comprise random characters.

Process step 30 transmits either resulting set of S U/P credentials back to the source of phishing scheme 100, e.g., a phisher's website address. That is, for either the less-careful or careful user, the present invention transmits a total of S U/P credentials to the source of phishing scheme 100. Accordingly, the receiver (i.e., the phisher) of the set of S U/P credentials cannot tell if the set includes a valid user credential. Transmission of the U/P credentials can proceed "one at a time" over a span of time of just a few milliseconds. In the case where process step 20 is used to generate the set of (S−1) fake U/P credentials, process step 20 or 30 (or a separate process step) can randomly position or mix the user's valid U/P credential in the (S−1) fake U/P credentials.

The value of S should be large enough to hinder or foil a phisher's attempts to verify the U/P credentials. At the same time, the value of S cannot be too large as this will impose processing constraints and time delays on client computer 10. A number of statistical approaches can be used to determine a value of S that balances the above criteria for a given application. Applying such statistical analyses, it has been found that S should be equal to or greater than 3, while not needing to be greater than 10 for most applications, thereby minimizing effects on client computer 10.

Figure 3:
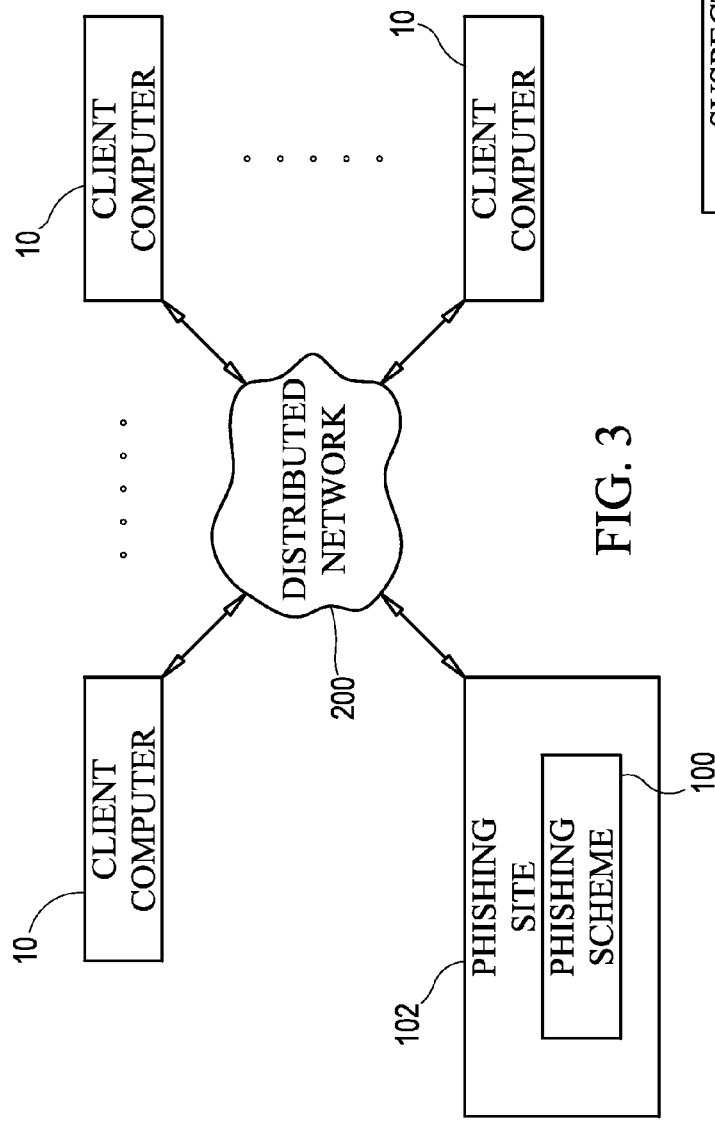
FIG. 3 is a schematic view of multiple client computers being attacked by a phisher using a distributed network.

As mentioned above, phishing attacks are generally implemented over a distributed network such as the internet. Accordingly, FIG. 3 illustrates a distributed network 200 over which multiple client computers 10 can communicate. Phishing scheme 100 is typically implemented by a phishing site 102 that issues its phishing attacks on client computers 10 via distributed network 200. Since such phishing attacks usually target multiple client computers 10, the generation/transmission of a set of S U/P credentials by each client computer 10 implementing the present invention will have an initial overwhelming effect on phishing site 102. Further, phishing site 102 cannot discern if any given set of S U/P credentials includes a valid U/P credential since the present invention transmits the same number of U/P credentials for users that heed or ignore the warning.

The generation of either (S−1) fake U/P credentials (at step 20) or S fake U/P credentials (at step 22) can utilize a simple substitution rule, although it is to be understood that other U/P credential generating rules could also be used without departing from the scope of the present invention. By way of non-limiting example, a substitution rule will be described herein as it will provide a correlated set of (S−1) or S fake U/P credentials. As will be explained further below, the advantage of producing correlated sets of U/P credentials is that a legitimate website could use this feature to determine when a phisher was attempting to gain access using U/P credentials originating from a user equipped with the present invention.

The exemplary substitution rule begins by deterministically computing an integer position "i" between 1 and the value of S as follows:

$$i = PRF(k, \text{original username}) \bmod S + 1$$

where k is a constant randomly chosen when the present invention is first installed or configured, "original username" is either a username entered as part of a valid U/P credential after a phishing warning is ignored or a fake username created at step 22 after a phishing warning is heeded, and PRF is a secure pseudo random function. Note that the random function generation of "i" provides reasonable assurances that "i" will vary between occurrences of its determination.

Because this formula only securely hashes the original username, it is applicable both to websites that ask a user to submit a U/P credential pair at the same time, and to websites that require a user to first submit a username and then submit a password.

Next, the present invention identifies the first digit in the original username as the username replacement character, denoted as username-rc. If the original username does not contain a digit, the first letter (upper or lower case) is identified as the username-rc. Using the same method, the present invention identifies the password replacement character in the original password, denoted as password-rc.

Then, for each integer position j from 1 to S inclusively where j-i, the present invention generates a bogus U/P credential pair by substituting both the username-rc character and the password-rc character in the original U/P credential pair using one of the following replacement methods:

(1) For the case of j-i>0: if the username-rc (also for password-rc) is a letter, this lower (or upper) case letter is replaced by another lower (or upper) case letter j-i places further down the alphabet, wrapped around if needed, i.e., 'z' is followed by 'a' (or 'Z' is followed by 'A'); if username-rc (also for password-rc) is a digit, this digit is replaced by another digit j-i places further down the single digit sequence "0123456789" wrapped around if needed, i.e., '9' is followed by '0'.

(2) For the case of j-i<0: if username-rc (also for password-rc) is a letter, this lower (or upper) case letter is replaced by another lower (or upper) case letter i-j places further up the alphabet, wrapped around if needed, i.e., 'a' is followed by 'z' (or 'A' is followed by 'Z'); if username-rc (also password-rc) is a digit, this digit is replaced by another digit i-j places further up the single digit sequence "0123456789", wrapped around if needed, i.e., '0' is followed by '9'.

The above-described substitution rule generates correlated sets of either (S−1) or S fake U/P credentials where the set of (S−1) fake U/P credentials are correlated to the valid U/P credential from which they were derived. In either case, a set of S U/P credentials is transmitted (i.e., at step 30 in FIG. 1) to the phisher. Based on the above described substitution rule, there are at most 2*(S−1) variations, i.e., down replacement would generate (S−1) variations and up replacement would generate (S−1) variations.

Figure 4:
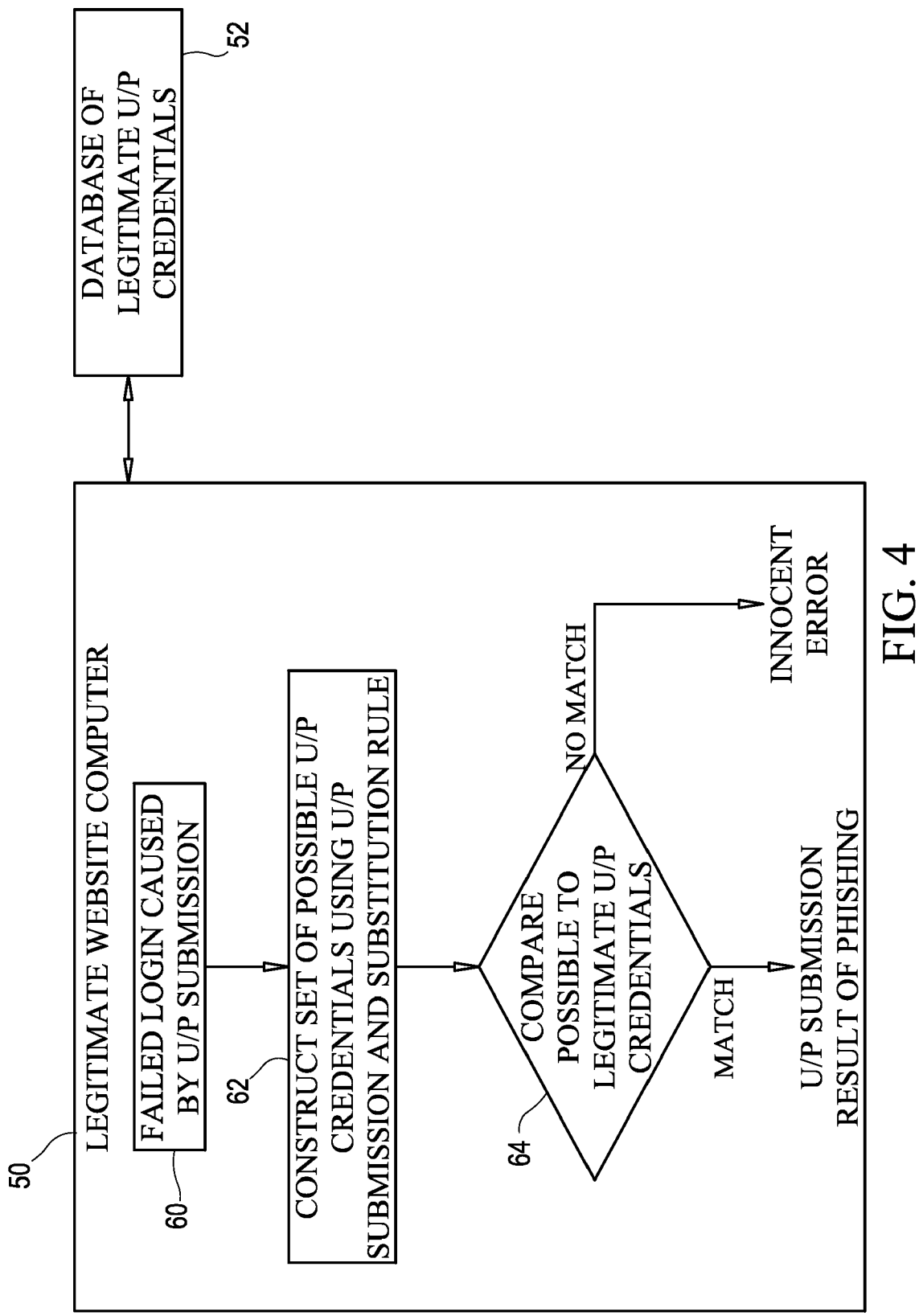
FIG. 4 is a top-level schematic view of a stolen credential identification process in accordance with another embodiment of the present invention.

Using knowledge of the correlated-set-generating substitution rule and its own secure database of valid U/P credentials, a legitimate website can determine when a phisher is attempting to verify U/P credentials generated by the present invention. Note that if a phisher is lucky enough to choose a less careful user's valid U/P credential on the first attempt at gaining access to a legitimate website, this login attempt will succeed and the legitimate website cannot detect the fact that the valid U/P credential was stolen. However, for any failed login attempt by the phisher, the legitimate website (i.e., its computer) can implement the procedure illustrated in FIG. 4 which can be teamed with the above-described procedure to identify when U/P credentials are stolen.

The legitimate website's computer 50 receives a U/P submission from some unknown source such as the phisher who just collected a set of S U/P credentials (i.e., either S fake U/P credentials or (S−1) fake U/P credentials along with the valid U/P credential). Computer 50 incorporates or has access to a database 52 of legitimate U/P credentials associated with the various users of the legitimate website's services. Computer 50 is also provided with the details of the substitution rule used by the various client computers as described above.

In accordance with the present invention, computer 50 detects a failed login attempt caused by the U/P submission at block 60. At step 62, computer 50 uses the provided substitution rule to construct a set of derived or possible U/P credentials based upon the U/P submission that caused the failed login attempt. Next, at step 64, computer 50 compares each constructed/possible U/P credential with those in database 52. If there is a match with one of the legitimate U/P credentials, the chances are high that the U/P submission causing the failed login attempt was one generated by the present invention during a phishing attack as described above. If there is no match, the failed login generated by the U/P submission was most likely caused by an innocent error.

If the failure of a login attempt is caused by a phisher who is verifying any one of the S U/P credentials it received, the above-described procedure will readily determine if the U/P submission originated from the set of S U/P credentials. Since computer 50 uses the same substitution rule to construct derived U/P credentials based on the U/P submission and then looks for a matching U/P credential with those in database 52, the probability is very high that a match is indicative of U/P submission that originated from a phisher trying to verify S U/P credentials provided thereto by a client computer 10 as described above. The legitimate website can then implement security to thwart the phisher.

The advantages of the present invention are numerous. The present invention is a new client-side anti-phishing tool that automatically protects vulnerable users by injecting a relatively large number of bogus credentials into phishing sites. These bogus credentials hide victims' real credentials, and force phishers to verify their collected credentials at legitimate websites. The credential verification actions initiated by phishers, in turn, create opportunities for legitimate websites to detect stolen credentials in a timely manner. The generation of bogus/fake U/P credentials is transparent to users and can be seamlessly integrated with current phishing detection and warning mechanisms on web browsers.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of protecting username/password credentials, comprising the steps of:

providing a client computer that cooperates with an anti-phishing scheme that generates a client warning at the client computer when a suspected phishing website issues a username/password request;

generating, at the client computer, a set of S fake username/password credentials when said client warning is heeded;

generating, at the client computer, a set of (S−1) fake username/password credentials derived from a client-supplied username/password credential provided after said client warning is ignored; and transmitting from the client computer to the suspected phishing website one of (i) said set of S fake username/password credentials, and (ii) said client-supplied username/password credential and said set of (S−1) fake username/password credentials.

2. A method according to claim 1, wherein each of said S fake username/password credentials is unique, and wherein said S fake username/password credentials are correlated to one another.

3. A method according to claim 1, wherein each of said (S−1) fake username/password credentials is unique, and wherein said (S−1) fake username/password credentials are correlated to one another.

4. A method according to claim 1, further comprising the step of randomly positioning said client-supplied username/password within said set of (S−1) fake username/password credentials prior to said step of transmitting.

5. A method according to claim 1, wherein (S−1)≧2.

6. A method according to claim 1, wherein S≦10.

7. A method according to claim 1, wherein said step of generating said S fake username/password credentials comprises the steps of:

creating a first of said S fake username/password credentials; and creating a remainder of said S fake username/password credentials by sequential applications of a substitution rule wherein a first of said sequential applications uses said first of said S fake username/password credentials.

8. A method according to claim 1, wherein said step of generating said (S−1) fake username/password credentials includes sequential applications of a substitution rule wherein a first of said sequential applications uses said client-supplied username/password credential.

9. A method of protecting username/password credentials, comprising the steps of:

providing a client computer with an internet web browser having at least one anti-phishing scheme operating therein, wherein each said scheme generates a client warning at the client computer when a suspected phishing website issues a username/password request;

generating, at the client computer, a set of S fake username/password credentials when said client warning is heeded, wherein 3≦S≦10;

generating, at the client computer, a set of (S−1) fake username/password credentials derived from a client-supplied username/password credential provided after said client warning is ignored;

randomly positioning said client-supplied username/password within said set of (S−1) fake username/password credentials; and transmitting from the client computer to the suspected phishing website one of (i) said set of S fake username/password credentials, and (ii) said set of (S−1) fake username/password credentials with said client-supplied username/password credential positioned therein.

10. A method according to claim 9, wherein each of said S fake username/password credentials is unique, and wherein said S fake username/password credentials are correlated to one another.

11. A method according to claim 9, wherein each of said (S−1) fake username/password credentials is unique, and wherein said (S−1) fake username/password credentials are correlated to one another.

12. A method according to claim 9, wherein said step of generating said S fake username/password credentials comprises the steps of:

creating a first of said S fake username/password credentials; and creating a remainder of said S fake username/password credentials by sequential applications of a substitution rule wherein a first of said sequential applications uses said first of said S fake username/password credentials.

13. A method according to claim 9, wherein said step of generating said (S−1) fake username/password credentials includes sequential applications of a substitution rule wherein a first of said sequential applications uses said client-supplied username/password credential.

14. A method of protecting username/password credentials, comprising the steps of:

providing a client computer with an internet web browser having at least one anti-phishing scheme operating therein, wherein each said scheme generates a client warning at the client computer when a suspected phishing website issues a username/password request, and wherein said client warning requires a selection of one of a first response that heeds said client warning and a second response that ignores said client warning;

generating, at the client computer, a correlated set of S fake username/password credentials when said first response is selected, wherein said correlated set of S fake username/password credentials is based on a rule;

generating, at the client computer, a correlated set of (S−1) fake username/password credentials derived from a client-supplied username/password credential provided after said second response is selected, wherein said correlated set of (S−1) fake username/password credentials is based on said rule; and transmitting from the client computer to the suspected phishing website one of (i) said correlated set of S fake username/password credentials, and (ii) said client-supplied username/password credential and said correlated set of (S−1) fake username/password credentials.

15. A method according to claim 14, further comprising the step of randomly positioning said client-supplied username/password within said (S−1) fake username/password credentials prior to said step of transmitting.

16. A method according to claim 14, wherein (S−1)≧2.

17. A method according to claim 14, wherein S≦10.

18. A method according to claim 14, wherein said step of generating said S fake username/password credentials comprises the steps of:

creating a first of said S fake username/password credentials; and creating a remainder of said S fake username/password credentials by sequential applications of said rule wherein a first of said sequential applications uses said first of said S fake username/password credentials.

19. A method according to claim 14, wherein said step of generating said (S−1) fake username/password credentials includes sequential applications of said rule wherein a first of said sequential applications uses said client-supplied username/password credential.

20. A method according to claim 14, further comprising the steps of:

providing a computer with said rule, the computer maintaining a database of legitimate username/password credentials;

receiving, at the computer, a username/password submission from a source;

generating, at the computer, a correlated set of possible username/password credentials derived from said username/password submission using said rule when said username/password submission does not match one of said legitimate username/password credentials; and comparing said correlated set of possible username/password credentials with said database of legitimate username/password credentials wherein a match between one of said possible username/password credentials and one of said legitimate username/password credentials is indicative of said username/password submission originating from said one of (i) said set of S fake username/password credentials and (ii) said set of (S−1) fake username/password credentials.

21. A method according to claim 14, wherein said rule is a substitution rule, and wherein each username and each password in said set of S fake username/password credentials is unique.

22. A method according to claim 14, wherein said rule is a substitution rule, and wherein each username and each password in said set of (S−1) fake username/password credentials is unique.

23. A method of protecting username/password credentials, comprising the steps of:

providing a client computer with an internet web browser having at least one anti-phishing scheme operating therein, wherein each said scheme generates a client warning at the client computer when a suspected phishing website issues a username/password request, and wherein said client warning requires a selection of one of a first response that heeds said client warning and a second response that ignores said client warning;

generating, at the client computer, a correlated set of S fake username/password credentials when said first response is selected, wherein $3 \leqq S \leqq 10$ and wherein said correlated set of S fake username/password credentials is based on a rule;

generating, at the client computer, a correlated set of (S−1) fake username/password credentials derived from a client-supplied username/password credential provided after said second response is selected, wherein said correlated set of (S−1) fake username/password credentials is based on said rule;

randomly positioning said client-supplied username/password within said correlated set of (S−1) fake username/password credentials; and transmitting from the client computer to the suspected phishing website one of (i) said correlated set of S fake username/password credentials, and (ii) said correlated set of (S−1) fake username/password credentials with said client-supplied username/password credential positioned therein.

24. A method according to claim 23, wherein said step of generating said S fake username/password credentials comprises the steps of:

creating a first of said S fake username/password credentials; and creating a remainder of said S fake username/password credentials by sequential applications of said rule wherein a first of said sequential applications uses said first of said S fake username/password credential.

25. A method according to claim 23, wherein said step of generating said (S−1) fake username/password credentials includes sequential applications of said rule wherein a first of said sequential applications uses said client-supplied username/password credential.

26. A method according to claim 23, further comprising the steps of:

providing a computer with said rule, the computer maintaining a database of legitimate username/password credentials;

receiving, at the computer, a username/password submission from a source;

generating, at the computer, a correlated set of possible username/password credentials derived from said username/password submission using said rule when said username/password submission does not match one of said legitimate username/password credentials; and comparing said correlated set of possible username/password credentials with said database of legitimate username/password credentials wherein a match between one of said possible username/password credentials and one of said legitimate username/password credentials is indicative of said username/password submission originating from said one of (i) said set of S fake username/password credentials and (ii) said set of (S−1) fake username/password credentials.

27. A method according to claim 23, wherein said rule is a substitution rule, and wherein each username and each password in said set of S fake username/password credentials is unique.

28. A method according to claim 23, wherein said rule is a substitution rule, and wherein each username and each password in said set of (S−1) fake username/password credentials is unique.

29. A method of protecting username/password credentials, comprising the steps of:

providing a client computer with an internet web browser having at least one anti-phishing scheme operating therein, wherein each said scheme generates a client warning at the client computer when a suspected phishing website issues a username/password request, and wherein said client warning requires a selection of one of a first response that heeds said client warning and a second response that ignores said client warning;

generating, at the client computer, a correlated set of S fake username/password credentials when said first response is selected, wherein said correlated set of S fake username/password credentials is based on a rule;

generating, at the client computer, a correlated set of (S−1) fake username/password credentials derived from a client-supplied username/password credential provided after said second response is selected, wherein said correlated set of (S−1) fake username/password credentials is based on said rule;

transmitting from the client computer to the suspected phishing website one of (i) said correlated set of S fake username/password credentials, and (ii) said client-supplied username/password credential and said correlated set of (S−1) fake username/password credentials;

providing a website computer that maintains a database of legitimate username/password credentials;

receiving, at the website computer, a username/password submission from a source;

generating, at the website computer, a correlated set of possible username/password credentials derived from said username/password submission using said rule when said username/password submission does not match one of said legitimate username/password credentials; and comparing, at the website computer, said correlated set of possible username/password credentials with said database of legitimate username/password credentials wherein a match between one of said possible username/password credentials and one of said legitimate username/password credentials is indicative of the source being a suspected phishing website.

30. A method according to claim 29, further comprising the step of randomly positioning said client-supplied username/password within said (S−1) fake username/password credentials prior to said step of transmitting.

31. A method according to claim 29, wherein (S−1)≧2.

32. A method according to claim 29, wherein S≦10.

33. A method according to claim 29, wherein said step of generating said S fake username/password credentials comprises the steps of:
- creating a first of said S fake username/password credentials; and
- creating a remainder of said S fake username/password credentials by sequential applications of said rule wherein a first of said sequential applications uses said first of said S fake username/password credentials.

34. A method according to claim 29, wherein said step of generating said (S−1) fake username/password credentials includes sequential applications of said rule wherein a first of said sequential applications uses said client-supplied username/password credential.

35. A method according to claim 29, wherein said rule is a substitution rule, and wherein each username and each password in said set of S fake username/password credentials is unique.

36. A method according to claim 29, wherein said rule is a substitution rule, and wherein each username and each password in said set of (S−1) fake username/password credentials is unique.

* * * * *